United States Patent

Tyves

[11] Patent Number: 5,186,509
[45] Date of Patent: Feb. 16, 1993

[54] BODY SIDE MOLDING ATTACHMENT

[75] Inventor: Zinovy Tyves, Tecumseh, Canada

[73] Assignee: General Motors Corporation, Detroit, Mich.

[21] Appl. No.: 896,088

[22] Filed: Jun. 1, 1992

[51] Int. Cl.⁵ .......................................... B60R 13/04
[52] U.S. Cl. ..................................... 296/1.1; 296/901; 293/128; 52/573; 52/718.04; 428/31
[58] Field of Search ............ 293/128; 52/718.1, 717.1, 52/716, 573; 296/1.1, 901; 248/901, 298; 428/31

[56] References Cited

U.S. PATENT DOCUMENTS

| | | | |
|---|---|---|---|
| 2,184,255 | 3/1937 | Kral | 24/73 |
| 2,695,435 | 2/1952 | Bedford, Jr. | 24/73 |
| 2,713,185 | 3/1952 | O'Herron | 24/73 |
| 2,758,350 | 11/1952 | Brown | 24/213 |
| 2,852,828 | 1/1955 | Hamman | 24/73 |
| 3,074,134 | 4/1961 | Buechler | 24/73 |
| 3,110,069 | 4/1958 | Jones | 24/73 |
| 3,141,209 | 8/1961 | Van Buren, Jr. | 24/73 |
| 3,178,786 | 12/1961 | Rapata | 24/73 |
| 3,205,546 | 8/1963 | Nelson | 24/213 |
| 3,242,543 | 3/1964 | Adams | 24/73 |
| 3,279,013 | 8/1965 | Fiddler | 24/73 |
| 3,357,064 | 2/1966 | Munse | 24/73 |
| 3,373,463 | 4/1966 | Wells | 24/73 |
| 3,461,637 | 4/1964 | Jansson | 52/718 |
| 4,529,244 | 7/1985 | Zaydel | 296/191 |
| 4,786,094 | 11/1988 | Barton et al. | 293/128 |
| 4,800,699 | 1/1989 | Lang | 52/717.1 |
| 4,869,937 | 9/1989 | Nagata et al. | 293/128 X |
| 5,086,603 | 2/1992 | Graf et al. | 52/718.1 |

*Primary Examiner*—Charles A. Marmor
*Assistant Examiner*—Joseph D. Pape
*Attorney, Agent, or Firm*—William A. Schuetz

[57] ABSTRACT

A molding assembly in which an elongated plastic molding is anchored to a vehicle door via a central clip and slidably supported by end clips so that thermal expansion and contraction takes place evenly from the midpoint of the molding so that the ends of the molding are always evenly spaced from the front and rear edges of the door. The end clips having flexible straps extending transversely of the sides of the clips and the straps are engageable with abutments on the molding so that the clips can be pre-assembled on the molding.

5 Claims, 2 Drawing Sheets

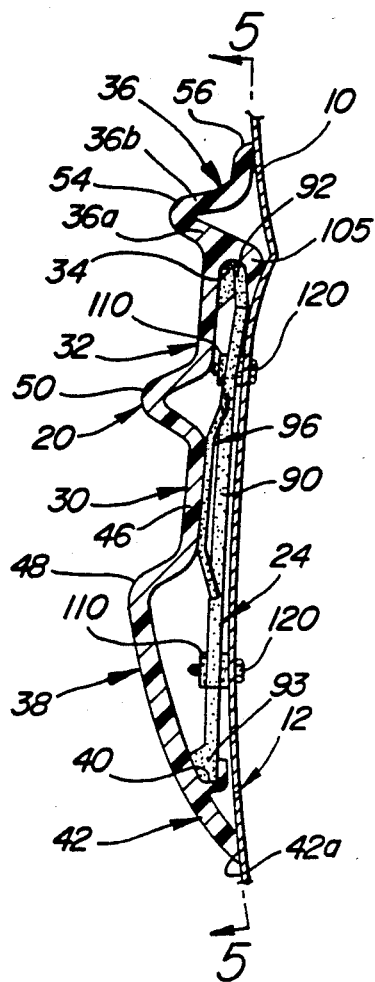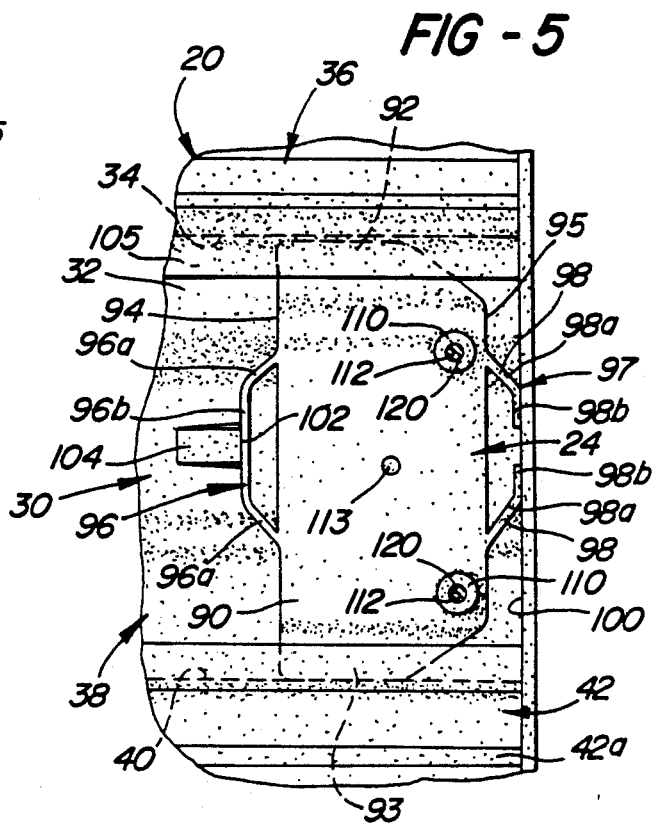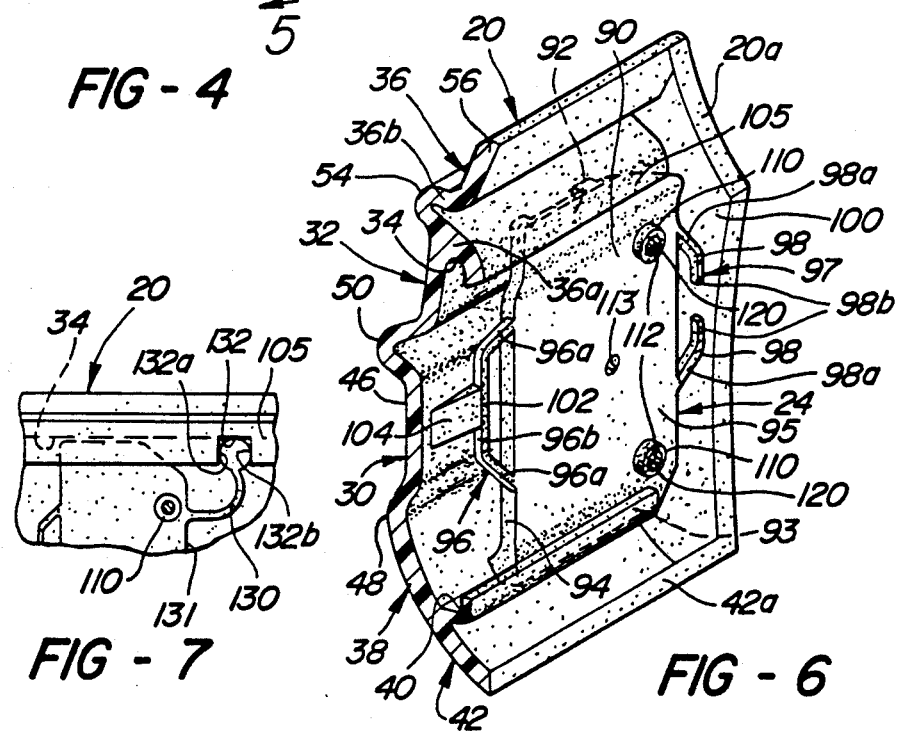

BODY SIDE MOLDING ATTACHMENT

The present invention relates to a body side molding assembly for automotive vehicles and, more particularly, to a body side molding attachment or retainer for retaining the molding in place but which allows the molding to slide relative thereto due to expansion and contraction of the molding.

It is common to provide decorative molding assemblies which extend horizontally across vehicle doors on their exterior sides. These moldings are usually anchored adjacent the front edge of the door panel and supported by plastic retainer clips at spaced longitudinal locations along their longitudinal extent. These clips allow the molding to migrate or longitudinally expand due to thermal expansion or contraction, the molding sliding relative to the clips. To avoid having too much expansion or contraction and create an uneven gap between the ends of the molding and the front and rear edges of the door panel, the type of plastic used for these moldings had to be such that little migration due to thermal expansion and contraction took place. This, however, eliminated the use of some plastic materials which have higher thermal expansion and contraction rates and which are less expensive.

In U.S. Pat. No. 5,086,603, assigned to the same assignee as the present invention, discloses a molding assembly comprising a molding made from a plastic material which can have a higher expansion or contraction rate and which has two different clips for retaining the molding in place on the door panel. The one clip is secured to the door panel and serves to engage the molding at its longitudinal midpoint to restrain the molding against longitudinal movement. The second type of clips were also secured to the door panel, but allowed the molding to slide relative thereto in a longitudinal direction due to thermal expansion and contraction. In this molding assembly the molding is attached to each of the clips by deflecting legs on the clips and then snap fitting the upper end of the molding over the upper end of the clip.

In accordance with the provisions of the present invention, a novel molding assembly is provided. The molding assembly is similar to the molding assembly shown in the prior patent, U.S. Pat. No. 5,086,603, in that the elongated molding is substantially the same and that the plastic molding is anchored to the door panel midway between the front and rear edges of the door by a clip which is the same as that disclosed in the aforementioned patent. The novel molding assembly differs, however, in that the other or second plastic retaining clips for mounting the molding to the door panel at other locations, and which allows for thermal expansion and contraction of the molding, is preassembled to the molding at spaced longitudinal locations.

The novel second molding retainer clips each comprise a generally planar body having opposed spaced ends and opposed spaced sides, a pair of spaced openings in the body and flexible strap means extending transversely of each of the sides. The strap means are flexible toward and away from the adjacent located side of the body and toward and away from the plane containing the body of the clip. The body of each retainer clip can be slidably received in channels in the molding and can be slid therealong until they are snap fittingly received between a pair of spaced pairs of abutments so that the clips can be preassembled to the molding. Thus, when the molding is attached to the first clip on the door panel at its center, the remaining second clips will be prepositioned so as to be aligned with the holes in the body panel so as to enable fasteners to be inserted from the opposite side of the body panel into the molding clip to retain the molding in place. These clips due to their flexible straps allow the molding to migrate or expand and contract longitudinally by sliding along the clips by deflecting the straps.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 4 is an enlarged fragmentary sectional view taken along line 4—4 of FIG. 1;

FIG. 5 is an enlarged fragmentary plan view of the back side of the molding assembly by looking in the direction of the arrows 5—5 of FIG. 4;

FIG. 6 is a fragmentary perspective view, with parts shown in section, of the novel molding assembly shown in FIG. 5; and FIG. 7 is a fragmentary plan view of an alternate embodiment of the novel molding assembly of the present invention.

Figure 1:
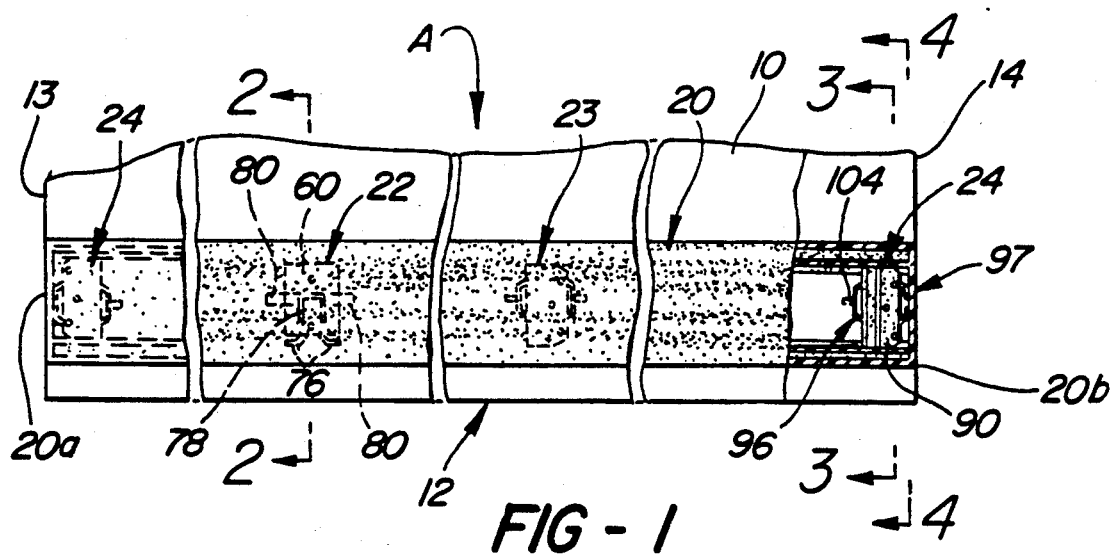
FIG. 1 is a fragmentary, side elevational view of a vehicle and showing the novel molding assembly of the invention mounted thereto.

The present invention provides a novel decorative molding assembly A which is mountable on an exterior panel of an automotive vehicle. The molding assembly A could be used in conjunction with various outer vehicle panels, but, as shown in FIG. 1, is preferably used for mounting to an exterior vehicle door panel 10 of a vehicle door 12. The vehicle door 12 could be of any suitable or conventional construction and is hereshown as including the outer panel having a front edge 13 and a rear edge 14.

The novel molding assembly comprises, in general, an outer decorative plastic molding 20, a first plastic spring clip or retainer 22 which is adapted to be mounted on the door panel and which functions to locate and anchor the outer molding 20 in place on the door panel 10 and second intermediate and end clips or retainers 23, 24, respectively, for supporting the outer molding 20 at its forward and rearward ends 20a, 20b and at locations intermediate the midpoint of the molding and the ends 20a, 20b. The clips 23, 24 are preassembled to the molding 20 and serve to permit the molding to slide longitudinally thereto when secured to the door panel 10.

The first spring clip or retainer 22 is located and anchored at the longitudinal midpoint of the outer molding 20 and at the longitudinal midpoint between the front and rear edges 13, 14 of the door panel 10 so that the ends 20a, 20b of the molding are flush with or evenly spaced inwardly from the front and rear edges 13, 14 of the door panel 10, respectively. By anchoring the molding 20 at its longitudinal midpoint any longitudinal movement of the molding due to thermal expansion or contraction will be even from the longitudinal midpoint so that any gap between the ends 20a, 20b of the molding 20 and the front and rear edges 13, 14 of the door panel 10 will always be even.

Figure 2:
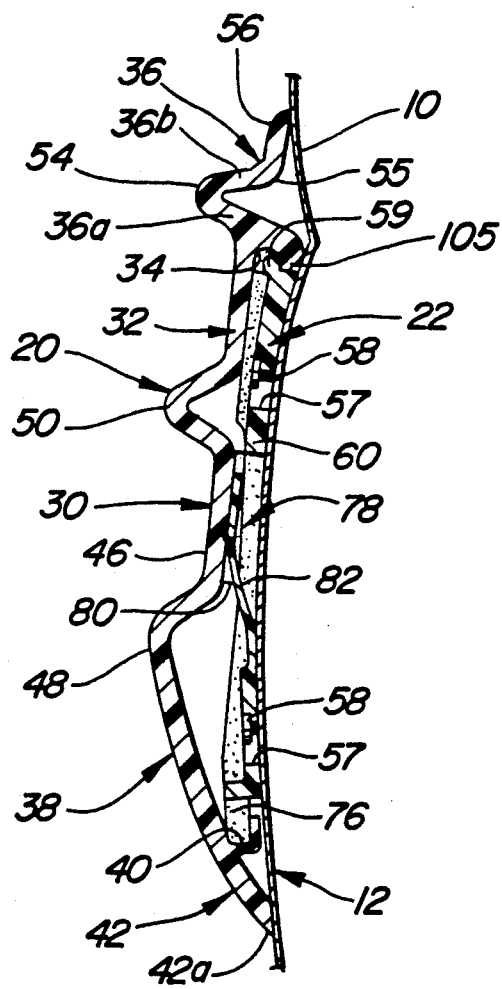
FIG. 2 is an enlarged fragmentary sectional view taken along line 2—2 of FIG. 1.
Figure 3:
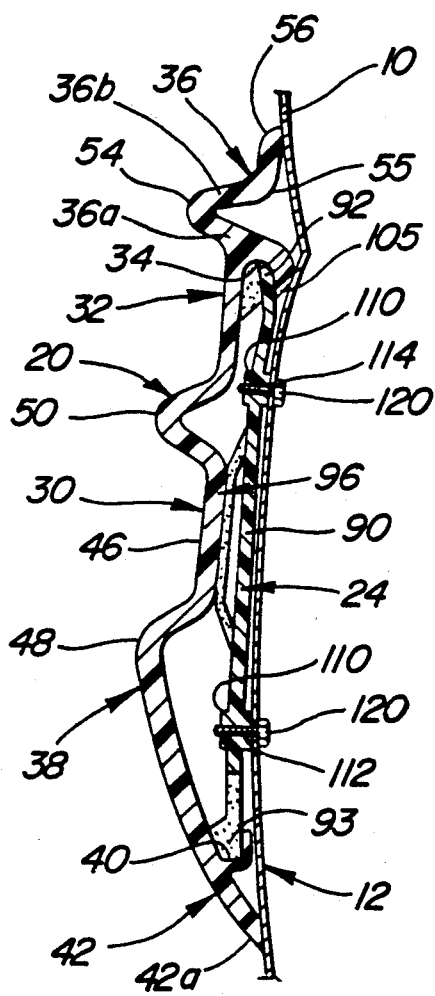
FIG. 3 is an enlarged fragmentary sectional view taken along lines 3—3 of FIG. 1.

The decorative or aesthetic molding 20 could be made of any suitable or conventional plastic material, which, when molded, is substantially rigid, but yet has some flexibility both longitudinally and laterally. The molding 20, as viewed in vertical cross section in FIGS. 2 and 3, comprises a midportion 30, an intermediate upper portion 32 which defines an elongated channel 34 facing downwardly, an upper flexible end portion 36, a lower intermediate portion 38 which defines an elongated upward facing channel 40 and a lower end portion 42. The midportion 30 could be convex or curved in shape, but, as shown in FIGS. 2 and 3 of the drawings, it is preferably molded to have a more decorative appearance. As shown in FIGS. 2 and 3, the midportion 20 is indented to define a longitudinally extending recess 46, a hump portion 48 adjacent the bottom of the recess 46 and an outwardly projecting portion or bump 50 adjacent the upper end of the recess 46.

The upper end 36 of the molding 20 is generally V-shaped in cross section to define legs 36a and 36b integrally joined at a bight 54. The leg 36a is integral with the upper intermediate portion 32 and the leg 36b is curved at 55 so as to be flexible about the longitudinal axis of its curve 55. The uppermost end 56 of the leg 36b of the molding is adapted to engage the outer door panel 10 when connected thereto and deflects outwardly of the door panel so as to provide a tight engagement with the panel 10. The lowermost portion is curved and has a free end 42a which is also engageable with the outer door panel 10 when the molding 20 is attached thereto.

The molding 20 is adapted to be mounted to the outer door panel via the mounting clips or attachments 22, 23 and 24. The mounting clip 22 serves to locate and anchor the molding 20 to the door panel 10. The mounting clip 22 is preferably attached to the door panel 10 prior to its being attached to the molding 20, but could be preassembled to the molding 20 and thereafter attached to the door panel 10. The mounting clip 22 shown in FIGS. 1 and 3 is identical to the clip 22 shown and described in the aforementioned U.S. Pat. No. 5,086,603, and will only be described herein to the extent necessary for a full understanding of the present invention. The mounting clip 22 is in the form of a bull horn spring clip having a generally rectangular shape. The clip comprises a generally planar rectangular shape central body portion 60 which is provided with a pair of through key hole slots 57 adjacent its upper and lower ends which are adapted to receive headed studs 58 welded or otherwise suitably secured to the metal outer body panel 10. The clip 22 is attached to the door panel 10 by positioning the enlarged portion of the key hole slots 57 over the headed studs 58 and then positioning the clips so that the shank of the studs are received in the smaller portion of the key hole slots to hold the clip in place. As best shown in FIG. 2, the clip 22 at its upper end has a bead or rounded projection 59 extending upwardly from the main body portion 60. The clip at its lower end has a pair of projecting deflectable legs or fingers 76. The legs 76 are integral with the main body portion at its lower end and extends downwardly therefrom, but diverge away from one another.

As best shown in FIG. 2, the molding 20 is attached to the first clip 22 (assuming the clip 22 is first attached to the door panel 10) by first positioning the lower portion of the molding 20 against the door panel and then moving the molding 20 upwardly so that the feet of the legs 76 of the clip 20 are received within the channel 40 defined by the intermediate portion 38. The molding 20 is then further moved upwardly to cause the legs 76 to be deflected away from each other as well as moved toward the door panel so that the upper intermediate portion 32 engages the projection 59 on the molding clip 22. The intermediate portion 32 of the molding is then force fitted over the projection 59 until the projection 59 is received within the channel 34 defined by the upper intermediate portion 32 as shown in FIG. 2. When this occurs, the upper leg 36 will have engaged the door panel 10 and will have been deflected therefrom so as to tightly engage the door panel. The legs 76 will provide a downward biasing force on the lower intermediate portion 38 to at all times maintain the channel 34 of the upper intermediate portion 32 over the projection 59 to maintain the molding 20 anchored to the clip 22.

To prevent the molding from moving longitudinally along the door panel relative to the first clip 22, a locating and retaining means 78 is provided. The locating and retaining means 78 comprises a pair of spaced abutments or ramps 80 molded integral with the molding on its backside at the intermediate portion 30 and a deflectable finger or tab 82 which, in the as-molded condition, is located out of the plane of the main body portion 60 of the molding clip and is integrally connected to the main body portion at its lower end. The deflectable finger 82 is free at its sides and its upper end so as to be deflectable toward and away from the plane of the main body portion 60. As clearly shown in FIGS. 1 and 2, the deflectable finger 82 is received between the ramps 80 when the molding 20 is attached to the clip 22 and with the finger 82 being deflected and biasingly engaging the backside of the molding between the ramps 80. The engagement between the sides of the finger 82 and the ramps 80 will hold the molding and prevent the same from being moved longitudinally relative to the clip 22 at its midpoint.

The novel intermediate clips 23 and end clips 24 are of an identical construction to each other with the exception of one feature to be hereinafter more clearly pointed out and, therefore, only the end clip 24 will be described in detail. The parts of the clip 23 which are identical will be given the same reference numerals in the drawings. As best shown in FIGS. 5 and 6, the end clip 24 comprises a one piece plastic molded clip or retainer 24. The clip 24 comprises a generally planar body portion 90, upper and lower ends 92, 93, spaced opposed side surfaces 94, 95 a first flexible strap means 96 integral with the left side 94 of the clip 24, as viewed in FIGS. 5 and 6, and a second strap means 97 integral with the right side 95 of the clip 24. The strap means 96, 97 extend laterally away from their respective sides 94, 95 of the clip 24 and also extend so as to be skewed slightly with respect to a plane containing the body portion 90 of the clip 24. The strap means 96, 97 are deflectable toward and from their respective sides 94, 95 and are also deflectable toward and from the plane of the body portion 90 of the clip 24, respectively. The strap means 96 comprises first portions 96a integral with the side 94 and which converge towards each other and an intermediate strap portion 96b connecting the strap portions 96a. The strap means 97 comprises a pair of straps 98 having a first portion 98a extending transversely of the side and converging towards each other and second portions 98b extending towards each other. The strap means 97 is identical to the strap means 96 except that the strap portions 98b have their adjacent ends spaced from each other rather than being joined to form an integral intermediate portion like the portion 96b of the strap means 96.

The straps 98 are adapted to engage an end wall 100 integral with the molding 20 and the strap portion 96b of the strap means 96 is adapted to engage an abutment surface 102 defined at the end of a tapered ramp 104 formed integral with the back side of the intermediate section 30 of the molding 20.

The clips 24 are adapted to be preassembled to the molding 20 from the back side thereof. The clips 24 are inserted and rotated so that their upper and lower ends 92, 93 are slidably received within the channels 34, 40. If necessary, the flange 105 defining part of the channel 34 could be notched (not shown) to permit insertion of the clip 24 so that it can be slidably received in the channels 34, 40. The clips can then be slid along the channels 34, 40 of the molding 20 and with the strap means 97, 96 successively engaging the tapered ramp or ramps 104 and being deflected toward the plane of the body 90 of the clip 24 until they pass over the ramp 104. The lateral distance between the outermost surfaces of the strap means 96, 97 is greater than the distance between the inner surface of the wall 100 and the abutment surface 102 of the tapered ramp 104. Thus, when positioning the clip within the molding 20, the clip would be slid until the strap means 97 is deflected toward the side 95 of the clip 24 to allow the strap 96 to pass past the ramp 104 and deflect toward the molding to lock behind the abutment surface 102. The clip 24 can then be released and with the two strap means 96, 97 biasingly engaging the end wall 100 and the abutment surface 102 of the ramp 104.

The clip 24 also includes a pair of vertically spaced bosses 110 having openings 112 therethrough. In addition the body of the clip has an opening 113. The clip 24 preassembled to the molding 20 is adapted to be secured to the door panel 10 from the backside of the panel 10. To this end, the openings 112 in the boss portions 110 will be aligned with or located closely adjacent to openings 114 in the panel 10 and suitable thread forming screw fasteners 120 are then used to secure the clip 24 in place against the panel, as shown in FIGS. 3 and 4.

The clips 23 are identical in construction to the clips 24 except that the righthandmost strap means 97 are identical to the lefthandmost strap means 96 since the intermediate clips 23 would be merely positioned between pairs of spaced ramps 104, as shown in FIG. 1.

From the foregoing, it should be apparent that the clips 23, 24 can be readily preassembled to the molding 20 and that after the molding 20 and clip 22 is attached to the clip 22 on the door panel 10, the holes 112 in the clips 23, 24 will be aligned with or closely aligned with the holes 114 in the door panel 10. If the openings 112 and 114 are not aligned, a means is provided to enable the clip 24 to be shifted to bring the holes 112 into alignment with the holes 114. To this end, the panel 10 would have a suitable opening therethrough (not shown) through which an operator could insert an awl or pointed tool to engage the opening 113 in the clip 24. The clip 24 could then be shifted laterally so as to align the openings 114 in the panel 10 with the openings 112 in the clip 24 prior to inserting the thread forming screws 24 through the openings 114 to self tap and engage the bosses 110 in the clip 24 to draw the clip 24 into tight engagement with the panel 10.

Thus the use of the flexible strap means 96, 97 on both sides of the clips 23, 24 not only enables the clips to be readily positionable to align the holes 112 with the holes 114 in the door panel 10, but also serve to deflect to allow the molding 20 to expand or contract and slide relative to the clips 23, 24.

FIG. 7 shows an alternate embodiment for the spring clips 23, 24 which could be employed. In this embodiment, the body 90 of the spring clips 23, 24 would merely have an L-shaped deflectable finger 130 formed integral with one of the sides 131 and which would be receivable within a recess 132 in the flange 105 of the molding 20 and with the sides of the recess forming abutments 132a, 132b. In this embodiment, the molding 20 could slide relative to the clip 23, 24 by causing the finger 130 to be deflected in a direction longitudinally of the molding 20.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A molding assembly for attachment to a vehicle body panel having pairs of spaced openings at spaced transverse locations comprising:
    an elongated plastic reveal molding having a front surface, a rear surface, first means integral with the rear surface which define a pair of spaced channels facing toward each other and a plurality of second means including tapered ramps which are integral with the rear surface, said second means defining spaced pairs of transversely extending abutment surfaces at spaced longitudinal locations along the molding,
    a plurality of molding retainer clips each comprising a generally planar body having opposed spaced ends and opposed spaced sides, a pair of spaced openings through said body and flexible strap means extending transversely of each of said sides, said strap means being flexible toward and away from its adjacently located side of said body and toward and away from a plane containing said body of said clip,
    said body of said each retainer clip being slidably receivable adjacent its opposed ends within said first means defining said channels on said molding and being slidable along said channels until they are snap fittingly received between a pair of said spaced pairs of said transverse abutment surfaces so that said clips can be preassembled to said molding, said strap means being deflectable toward the plane of said body of said clip as they pass over said ramps as said clip is slid along said channels and then returning to their free state position in which said strap means are disposed between said abutment surfaces, said strap means being biasingly engageable with said abutment surfaces when the clips are preassembled to said molding, a third means for mounting said molding adjacent its longitudinal midpoint to said panel, said openings in said fastener clips being substantially aligned with a pair of said spaced openings in said panel when said molding is mounted adjacent its midpoint to said panel, and fastener means insertable through said pairs of openings in said panel from its side opposite said molding and threadably engageable with said clips along their through openings for securing said clips to said panel and for retaining said molding to said panel at locations spaced from its midpoint, said transverse abutment surfaces on said molding causing said strap means on said fastener clips to deflect so that longitudinal sliding movement of said molding relative to said clips can take place due to thermal expansion and contraction of said molding and with such expansion and contraction taking place evenly from said midpoint of said molding.

2. A molding assembly for attachment to a vehicle body panel having pairs of spaced openings at spaced transverse locations comprising:

an elongated plastic reveal molding having a front surface, a rear surface, first means integral with the rear surface which define a pair of spaced channels facing toward each other and a plurality of second means including tapered ramps and end walls of the molding which are integral with the rear surface, certain of said ramps and said end walls and adjacently located ramps of said second means defining spaced pairs of transversely extending abutment surfaces at spaced longitudinal locations along the molding, a plurality of molding retainer clips each comprising a generally planar body having opposed spaced ends and opposed spaced sides, a pair of spaced openings through said body and flexible strap means integral with and extending transversely of each of said sides, said strap means being flexible toward and away from their adjacently located sides of said body and toward and away from a plane containing said body of said clip, said body of said each retainer clip being slidably receivable adjacent its opposite ends within said first means defining said channels on said molding and being slidable along said channels until they are snap fittingly received between a pair of said ramps on said molding or a ramp and said end wall of said molding defining said spaced pairs of said transverse abutment surfaces so that said clips can be preassembled to said molding, said strap means being deflectable toward the plane of said body of said clip as they pass over said ramps as said clip is slid along said channels and then returning to their free state position in which said strap means are disposed between said abutment surfaces, said strap means being biasingly engageable with said abutment surfaces when the clips are preassembled to said molding, a third means for mounting said molding adjacent its longitudinal midpoint to said panel, said openings in said fastener clips being substantially aligned with a pair of said spaced openings in said panel when said clips are preassembled to said molding and said molding is mounted adjacent its midpoint to said panel, and fastener means insertable through said pairs of openings in said panel from its side opposite said molding and threadably engageable with said clips along their through openings for securing said clips to said panel and for retaining said molding to said panel at locations spaced from its midpoint, said transverse abutment surfaces on said molding causing said strap means on said fastener clips to deflect so that longitudinal sliding movement of said molding relative to said clips can take place due to thermal expansion and contraction of said molding and with such expansion and contraction taking place evenly from said midpoint of said molding.

3. A molding assembly for attachment to a vehicle body panel having pairs of spaced openings at spaced transverse locations and additional openings comprising:

an elongated plastic reveal molding having a front surface, a rear surface, first means integral with the rear surface which define a pair of spaced channels facing toward each other and a plurality of second means including tapered ramps and end walls of the molding which are integral with the rear surface, certain of said ramps and said end walls and adjacently located ramps of said second means together defining spaced pairs of transversely extending abutment surfaces at spaced longitudinal locations along the molding, a plurality of one piece, plastic molding retainer clips each comprising a generally planar body having opposed spaced ends and opposed spaced sides, first and second openings through said body and spaced a distance apart equal to said spaced openings in said panel, a third opening through said body and flexible strap means extending transversely of each of said sides, said strap means being flexible toward and away from their adjacently located sides of said body and toward and away from a plane containing said body of said clip, said body of said each retainer clip being slidably receivable adjacent its opposite ends within said first means defining said channels on said molding and being slidable along said channels until they are snap fittingly received between a pair of said ramps on said molding or a ramp and said end wall of said molding defining said spaced pairs of said transverse abutment surfaces so that said clips can be preassembled to said molding, said strap means being deflectable toward the plane of said body of said clip as they pass over said ramps as said clip is slid along said channels and then returning to their free state position in which said strap means are disposed between said abutment surfaces, said strap means being biasingly engageable with said abutment surfaces when the clips are preassembled to said molding, a third means for mounting said molding adjacent its longitudinal midpoint to said panel, said first and second and third openings in said fastener clips being substantially alignable with said pair of said spaced openings in said panel and said additional openings in said panel, respectively, when said molding is mounted adjacent its midpoint to said panel, said clip being movable between its adjacently located abutment surfaces in opposition to the biasing force of said strap means by inserting a tool through said third opening in said panel and said third opening in said clip to align said first and second opening in said clip and panel, and fastener means insertable through said first and second openings in said panel from its side opposite said molding and threadably engageable with said clips along their first and second through openings when aligned therewith for securing said clips to said panel and for retaining said molding to said panel at locations spaced from its midpoint, said transverse abutment surfaces on said molding causing said strap means on said fastener clips to deflect so that longitudinal sliding movement of said molding relative to said clips can take place due to thermal expansion and contraction of said molding and with such expansion and contraction taking place evenly from said midpoint of said molding.

4. A molding assembly, as defined in claim 3, and wherein said flexible strap means have their outermost sides spaced apart when in their normal free state position which is slightly greater than the distance between said adjacently located abutment surfaces.

5. A molding assembly, as defined in claim 3, and wherein said strap means are defined by first and second end sections integral with the side of the clip and which converge toward each other and an intermediate section integral with the first and second sections and which lies in a plane extending parallel to said side of said clip.

* * * * *